(12) United States Patent
Fujita et al.

(10) Patent No.: US 8,972,881 B2
(45) Date of Patent: Mar. 3, 2015

(54) ADD-IN FOR DOWNLOAD, UPLOAD, AND REWRITING

(75) Inventors: Takeshi Fujita, Chiba ken (JP); Tsutomu Kawachi, Tokyo (JP); Keiichi Ogawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1473 days.

(21) Appl. No.: 12/439,903

(22) PCT Filed: Sep. 3, 2007

(86) PCT No.: PCT/JP2007/067154
§ 371 (c)(1),
(2), (4) Date: Sep. 2, 2010

(87) PCT Pub. No.: WO2008/029774
PCT Pub. Date: Mar. 13, 2008

(65) Prior Publication Data
US 2011/0016418 A1    Jan. 20, 2011

(30) Foreign Application Priority Data

Sep. 4, 2006 (JP) ................................ 2006-239636
Mar. 13, 2007 (JP) ................................ 2007-063973

(51) Int. Cl.
*G06F 3/048* (2013.01)
*G06F 3/0486* (2013.01)

(52) U.S. Cl.
CPC .................................... *G06F 3/0486* (2013.01)
USPC ........................................................ 715/769

(58) Field of Classification Search
USPC ........................................................ 715/769
See application file for complete search history.

(56) References Cited

U.S. PATENT DOCUMENTS 6,693,652 B1 * 2/2004 Barrus et al. .................. 715/838
6,877,138 B2 * 4/2005 Fitzpatrick et al. ........... 715/769
(Continued)

FOREIGN PATENT DOCUMENTS

JP 2002-063056 2/2002
JP 2002-132618 5/2002
(Continued)

OTHER PUBLICATIONS

Buyens, "Microsoft Office FrontPage 2003", 2004.*
(Continued)

*Primary Examiner* — Matt Kim
*Assistant Examiner* — Ryan Barrett
(74) *Attorney, Agent, or Firm* — K&L Gates LLP

(57) ABSTRACT

[PROBLEMS TO BE SOLVED] It is an object to expand the functions of web applications, so that labor or the like to directly use a method for an operating system can be reduced. [MEANS FOR SOLVING THE PROBLEMS] A processing means of a terminal device includes a memory means for storing an HTML object and drag information in relation to each other and drag information in relation to a certain HTML object is read out from the memory means (S35) in the case that the HTML object is moved from the inside of an HTTP client display area to the outside. The processing means of the terminal device makes out and registers a drag object for the operating system based on the read out drag information (S40, S45). The processing means of the terminal device receives real data corresponding to the drag object from an outer information providing system to store the same at the memory means of the terminal device.

9 Claims, 12 Drawing Sheets

(56) References Cited

U.S. PATENT DOCUMENTS

| | | | |
|---|---|---|---|
| 6,931,600 B1* | 8/2005 | Pittman | 715/767 |
| 6,978,378 B1* | 12/2005 | Koretz | 713/193 |
| 6,993,531 B1* | 1/2006 | Naas | 1/1 |
| 7,000,184 B2* | 2/2006 | Matveyenko et al. | 715/235 |
| 7,343,559 B1* | 3/2008 | Fujita et al. | 715/733 |
| 7,499,989 B2* | 3/2009 | Amadio et al. | 709/222 |
| RE43,751 E* | 10/2012 | Tange | 709/217 |
| 2002/0070966 A1* | 6/2002 | Austin | 345/763 |
| 2003/0132967 A1* | 7/2003 | Gangadharan | 345/769 |
| 2004/0070608 A1* | 4/2004 | Saka | 345/748 |
| 2004/0100501 A1* | 5/2004 | Dornback | 345/769 |
| 2004/0113951 A1* | 6/2004 | Brockway | 345/811 |
| 2004/0250215 A1* | 12/2004 | Chen et al. | 715/769 |
| 2005/0091603 A1* | 4/2005 | Chen et al. | 715/769 |
| 2006/0070007 A1* | 3/2006 | Cummins et al. | 715/769 |
| 2007/0006089 A1* | 1/2007 | Bales et al. | 715/769 |
| 2007/0186178 A1* | 8/2007 | Schiller | 715/769 |
| 2007/0220008 A1* | 9/2007 | Mizhar et al. | 707/10 |
| 2008/0005661 A1* | 1/2008 | Yao et al. | 715/513 |
| 2008/0184148 A1* | 7/2008 | Selig | 715/769 |
| 2009/0024946 A1* | 1/2009 | Gotz | 715/769 |
| 2010/0269056 A1* | 10/2010 | Fujita et al. | 715/760 |

FOREIGN PATENT DOCUMENTS

| | | |
|---|---|---|
| JP | 2002-259805 | 9/2002 |
| JP | 2002-351731 | 12/2002 |
| JP | 2004-220319 | 8/2004 |
| JP | 2005-242965 | 9/2005 |

OTHER PUBLICATIONS

Domain Avenue, "Microsoft Internet Explorer 6 (IE6) Drag-and-Drop files to FTP servers," Dec. 10, 2003, https://web.archive.org/web/20031210102815/http://domainavenue.com/support_ie6.htm.*

Benzinger, "FtpDropper: Windows Drag & Drop FTP," Aug. 31, 2005, http://www.solutionwatch.com/203/ftpdropper-windows-drag-drop-ftp/.*

Esposito, "Enable Your Windows Forms Applications to Drag-and-Drop Data Objects," Aug. 31, 2004, http://www.codemag.com/Article/0407031.*

O'Reilly, "Drag-and-Drop with Files," Jun. 18, 2005, http://oreilly.com/pub/h/4873.*

Japanese Patent Office, Office Action, issued in connection with Japanese Patent Application No. 2007-042697, dated Nov. 8, 2011. (3 pages).

Misetsuna, "COM/Active X practical use technique", Inside Windows, vol. 4, No. 6, Japan, Softbank Corporation, May 1, 1998, vol. 4, No. 6, pp. 20-40.

Japanese Office Action issued on Feb. 1, 2011, for corresponding Japanese Appln. No. 2008-533150.

Japanese Office Action issued on May 10, 2011 corresponding to Japanese Application No. 2008-533150.

DocumentBroker Web Client Version2 explanation, Manual, Common manual, Edition 6, Hitachi, Ltd., Jun. 30, 2002, Edition 6, pp. 266-277.

* cited by examiner

ADD-IN FOR DOWNLOAD, UPLOAD, AND REWRITING

CROSS-REFERENCE TO RELATED APPLICATIONS

This application is the National Stage of International Application No. PCT/JP2007/067154 filed Sep. 3, 2007, which claims the benefit of Japanese Patent Application No. 2006-239636 filed Sep. 4, 2006 and Japanese Patent Application No. 2007-063973 filed Mar. 13, 2007, the disclosures of which are incorporated herein by reference in their entireties.

TECHNICAL FIELD

The invention is related to add-in programs that extend function of the HTTP client, like the web browser, especially function of the web applications running on the HTTP client.

BACKGROUND

ActiveX Control (Trade Mark) makes it feasible to extend function of the web application, as state of art. The approach of the drag and drop operation on an icon displayed on the folder of the operating system (OS) onto the designated ActiveX Control (Trade Mark) of the web application running on the HTTP client can afford to copy (upload) or move a file corresponding to the icon to a designated server from the terminal.

Moreover, the approach of the drag and drop operation on an icon displayed on the web application running on the HTTP client onto the designated ActiveX Control (Trade Mark) of the web application can afford to copy (download) or move a file corresponding to the icon to the terminal from a designated server.

ActiveX Control (Trade Mark) is described in the native code of the operating system, therefore it can directly access the methods and others of the operating system.

However, to directly use the methods of the operating system by extending function of the web application requires such the heavy loaded work that ActiveX Control (Trade Mark) is created corresponding to each object of the web application which uses methods of the operating system and it should be embedded in the HTML file of the web application.

Moreover, it requires that a web application implementer should intensely makes craft to extend function of the web application for realizing directly use of the methods of the operating system.

Moreover, there is no continuousness between running the methods of the HTML script and running the methods of the operating system makes it difficult to provide an intuitive and easy understandable user interface. For example, it is impossible to download a text file corresponding to the above HTML object to the folder of the operating system by a simple drag and drop operation on the HTML object displayed on the display region of the HTTP client onto the folder of the operating system.

The Applicant does not know the similar inventions in the sate of art.

SUMMARY

The present disclosure provides noble approaches to improve the above drawbacks of the sate of arts, especially powerful approach to extend function of the web applicant and reduce the over load for direct use of the methods of the operating system. It realizes direct use of the methods of the operating system by providing to easily extend function of web application without a web application implementer's intensive craft. It makes continuation between running the methods of the HTML script and running the methods of the operating system and provides an intuitive and easy understandable user interface.

A downloading add-in method extends the function of the HTTP client of the terminal that includes a storage unit, an input device, and a processing unit. The downloading add-in method especially adds the download function to the HTTP client. The download method may be used by the computer system which the terminal running the HTTP client and the information provider system are connected with the network communication unit.

An uploading add-in method extends the function of the HTTP client of the terminal that includes a storage unit, an input device, and a processing unit. The uploading add-in method adds the upload function to the HTTP client. An uploading add-in method extends upload function to a program that is used in the terminal providing a storage unit that stores the upload path identification for determining the upload target, an input device, and a processing unit.

A rewriting add-in program extends function of the HTTP client of the terminal that includes a storage unit which saves the designated HTML tag identifiers, an input device, and a processing unit, which enables the HTTP client to rewrite the attribute of the HTML object.

DETAILED DESCRIPTION OF ILLUSTRATIVE EMBODIMENTS

The following notation is used in the FIGS. 1-12:
10 Terminal
11 Interface bus
12 CPU (Processing Unit)

13 RAM (Storage Unit)
14 ROM (Storage Unit)
15 NIC (Network Communication Unit)
16 Keyboard (Input device)
17 Mouse (Input device)
18 Display (Display device)
19 HDD (Storage Unit)
20 Information Provider System
21 Interface bus
22 CPU (Processing Unit)
23 RAM (Storage Unit)
24 ROM (Storage Unit)
25 NIC (Network Communication Unit)
26 HDD (Storage Unit)
30 The Internet
40 Icon as HTML Object
41 Icon displayed on display region of file destination application
50 Icon moving with mouse pointer at dragging The effect of the disclosed system is such that the steps of creating an ActiveX (Trade Mark) control for each web application and embedding the ActiveX (Trade Mark) control into the HTML file of the web application are not needed and so extending function of the web application to use the method of the operating system directly needs less load.

By the benefit that the add-in program process runs the method of the operating system, without intensive craft by the web application creator, to extend function of the web application enable it feasible to directly use the methods of the operating system.

To make perform continually the HTML script's method and the operating system's method by the add-in program provides an intuitive and easy understandable user interface.

The drag and drop operation enables to rewrite the attribute of the designated HTML object based on the context of the real data corresponding to the drag object.

The drag and drop operation enables to download and upload the real date corresponding to the drag object.

Figure 1:
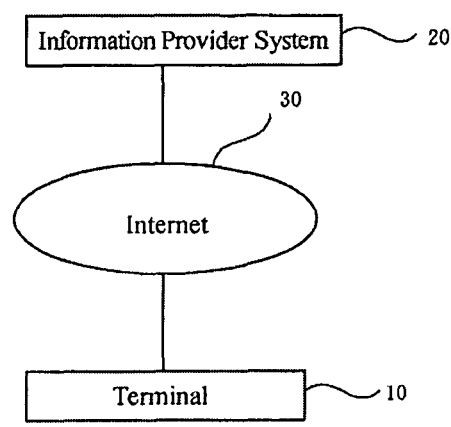
FIG. 1 is a diagram of an overall computer system.

FIG. 1 is the block diagram that shows the overall of the computer system. The terminal 10 and the information provider system 20 are connected to the Internet 30 that is communication networks. The connection style among the terminal 10 or the information provider system 20 and the Internet 30 is allowed to be wired or wireless.

Figure 2:
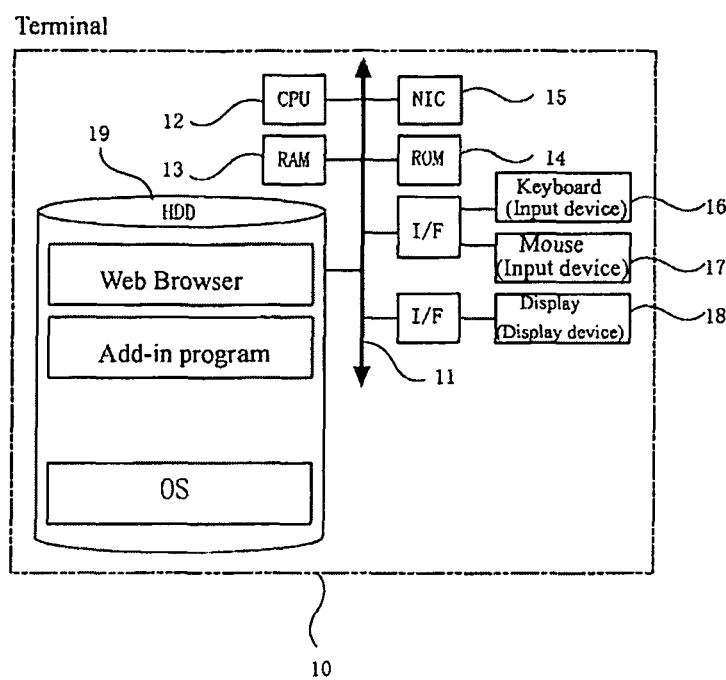
FIG. 2 is a structure diagram of an example terminal.

FIG. 2 is the structure diagram of the terminal 10. CPU 12 as processing unit, RAM 13, ROM 14 and HDD 19 (Hard Disk Drive) as storage unit, keyboard 16 and mouse 17 as input devices, Display 18 as display device, and NIC 15 (Network Interface Card) as network communication unit are connected with the interface bus 11. The web browser program, the add-in programs, operating systems and others are stored in HDD 19. In an embodiment, Internet Explorer (Trade Mark) is exploited as the web browser. The CPU of the terminal 10 driven by the web browser program can display the contents provided by the information provider system 20. The CPU of the terminal 10 driven by the add-in programs can extends function of the web browser. The terminal 10 exploits Windows (Trade Mark) as operating system, without special notice, that is applicable. As the terminal 10, PC (Personal Computer), PDA (Personal Digital Assistance), Internet connectable mobile phones are all applicable, in an embodiment, PC is exploited.

Figure 3:
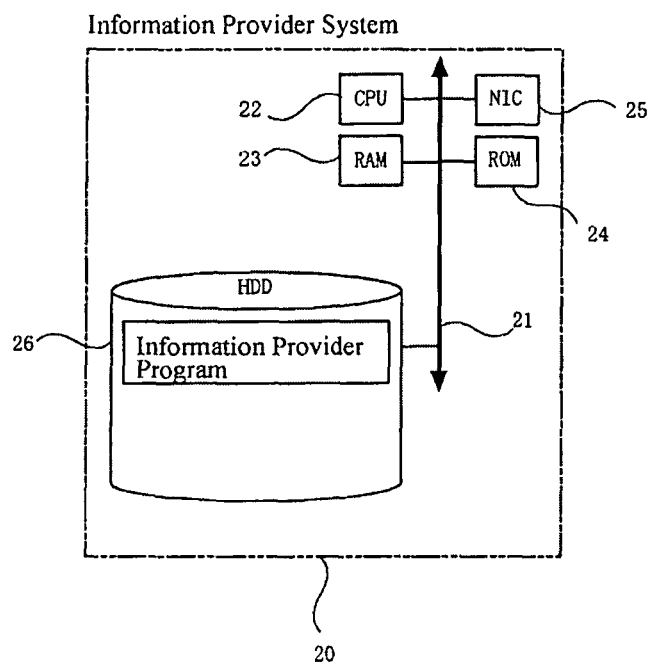
FIG. 3 is a structure diagram of an example information provider system.

FIG. 3 is the structure diagram of the information provider system 20. CPU 22 as processing unit, RAM 23, ROM 24 and HDD 26 (Hard Disk Drive) as storage unit, and NIC 25 (Network Interface Card) as network communication unit is connected with the interface bus 21. Information provider program and others are stored in HDD26. The CPU of the information provider system 20 driven by the information provider program can provide contents. In an embodiment, a typical web browser is exploited as the information provider system 20.

Figure 4:
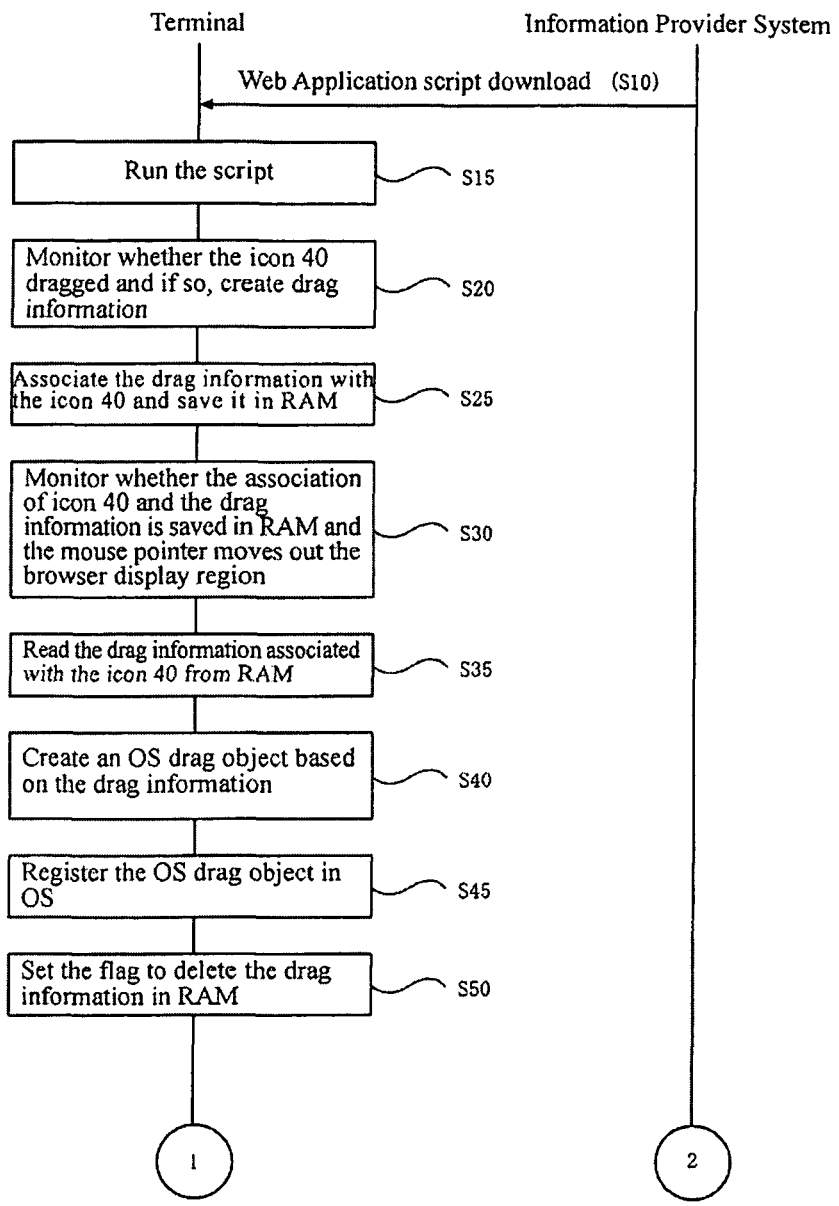
FIG. 4 is a flowchart of the terminal and information provider system when the HTML object displayed on the web browser is dragged and dropped onto the folder of the operating system.
Figure 5:
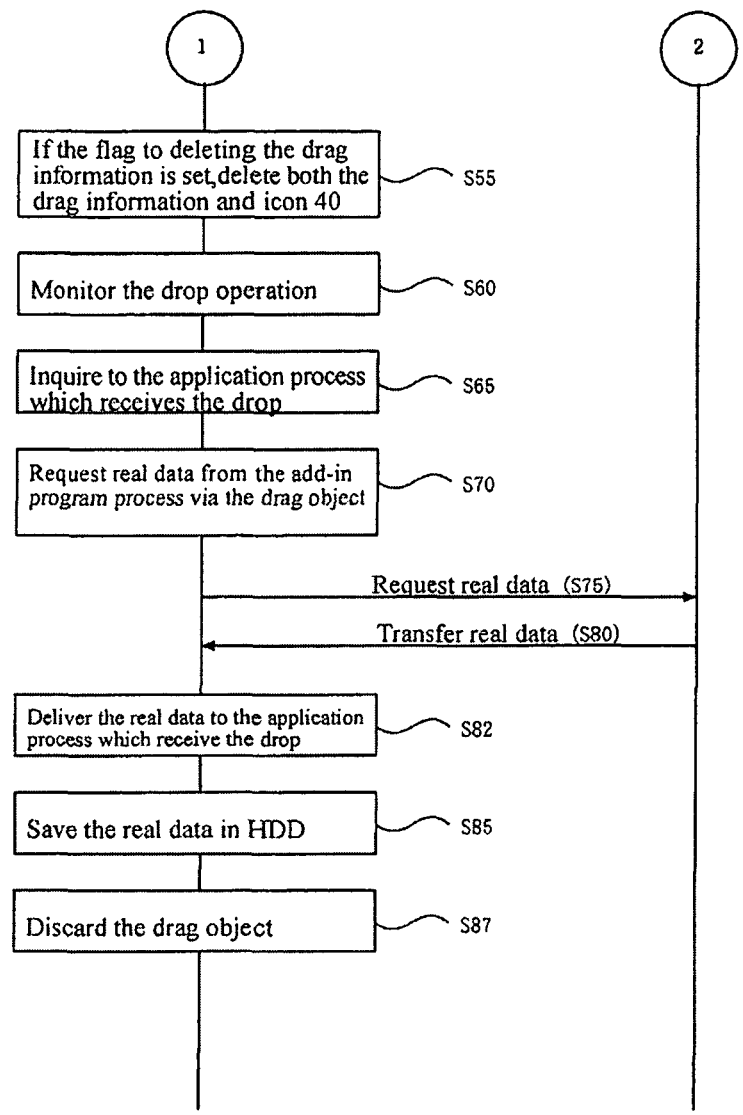
FIG. 5 is a continuation of FIG. 4.

The performance of the computer system of in a first embodiment is described as follows. FIG. 4 and FIG. 5 are the flowcharts of the terminal 10 and the information provider system 20 when the HTML object displayed on the web browser is dragged and dropped into the folder of the operating system.

The CPU of the terminal 10 driven by the web browser process downloads the application script from the information provider system 20. (S10) In the first embodiment, it downloads a HTML file containing JavaScript (Trade Mark) logic; it also can download an external js file. This is applicable except special description. The CPU of the terminal 10 driven by the web browser process runs the acquired web application script. (S15) The HTML file containing JavaScript (Trade Mark) logic keeps the cgi path of the file request destination of request to acquire file to the web application process. This is applicable for all embodiments except special description. The cgi path means the information system 20 can identify a cgi (Common Gateway Interface) for transferring a file requested from the terminal 10, and the cgi's URL is applicable. In reality, cgi path is described like 'http://domain/xxx.cig'. The cgi is a part of the information provider program.

Figure 6:
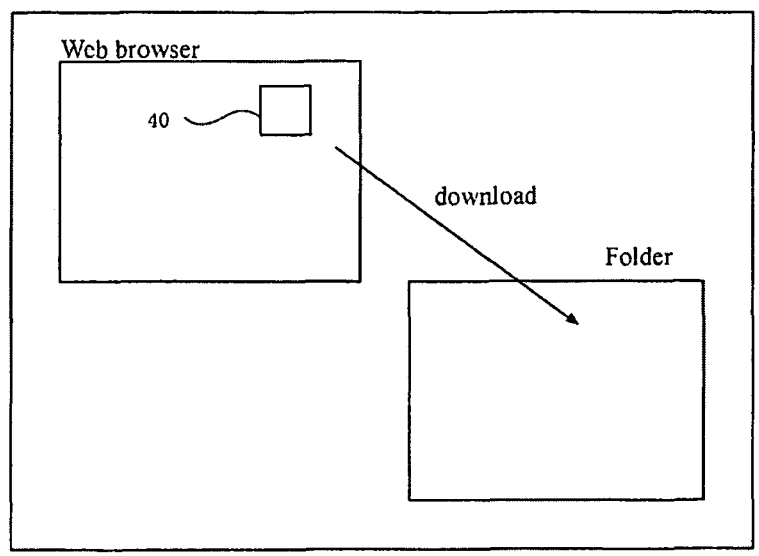
FIG. 6 is a structure diagram of an example display device when the web browser and the folder of the operating system are displayed on it.

FIG. 6 is the structure diagram of the display on which the web browser and the folder of the operating system are displayed. On the display area of the web browser the icon 40 corresponding to a designated file saved in HDD of the information provider system 20 is displayed as an HTML object by web application function. The HTML object can run the designated script driven by the mousedown event, mousemove event and mouseup event. This can enable the HTML object to move by using the mouse. The folder of the operating system is displayed by the general function of the operating system rather than function of the web application.

The CPU of the terminal 10 driven by the web application process monitors whether the icon 40 is dragged and if so, creates the drag information and creates the icon 50 which moves along the mouse pointer during dragging. (S20) The CPU of the terminal 10 driven by the web application process associates the drag information with the icon 40 and saves it in RAM. (S25) The drag information at least contains the file identifier for the real data corresponding to the dragged object, in an embodiment, as for the file identifier it contains a path identifier to identify the path to the real data of the information provider system 20. As for the path identifier, that may be the URL as parameter for GET request to cgi (Common Gateway Interface) or for acquiring real data. In reality, if the request URL is 'http://domaion/xxx.cig?path=/directory/aaa.tex', the following part of '?path', 'directory/aaa.txt' becomes the path identifier. In this case, the file identifier of the real data is 'http://domain/xxx.cig?path=/directory/aaa.txt'. The front part before the last slash of the path identifier means the path for locating the file; the tail part after the last slash is the file name of the file. The file saved in HDD of the information provider system 20 is the file of name 'aaa.txt' located in the path '/directory'. The part after the "?" can be encoded to URL. This is applicable below. In the first embodiment, the above file identifier is embedded in the HTML object when the HTML object is acquired from the information provider system 20 by the web application process.

The CPU of the terminal 10 driven by the add-in program process monitors whether the association of the icon 40 and the drag information is saved in RAM and the mouse pointer moves out the web browser display region. (S30) The CPU of the terminal 10 performs the following steps caused by the recognition.

The CPU of the terminal 10 driven by add-in program process reads the drag information associated with the Icon 40 from RAM. (S35) The CPU of the terminal 10 driven by the add-in program process creates the drag object of the operating system based on the drag information. (S40) This means the add-in program process creates a drag object (an object implementing IDataObject) as a typical Windows (Trade Mark) drag and drop object. The object can hold multiple information of the drag source object, and it can at least hold a path identifier based on the drag information. Moreover by acquiring the name displayed as an HTML object and others, it is possible to hold the file name after dropped by Windows (Trade Mark).

Action for creating a drag object and its supporting action are explained in more detailed. The instance of the class (an object) which implements the IDataObject interface of COM (Component Object Model) is implemented to save plural information of associations of the file identifiers of the server side data URL and the string information as the file name after dropped in Windows (Trade Mark) local. Moreover the instance of the class (an object) which implements IStream interface of COM is implemented to hold plural file identifiers of server side data URL or others, and when the dropped source application issues a request, based on the file identifier and the cgi (Common Gateway Interface) request source information acquired from the HTML file containing the script for acquiring the file, the dropped source application issues an HTTP GET request to get data from the server and passes the data in a stream format to the dropped sourced application. As for these interface, IDataObject and IStream are typical programming interfaces and obviously defined in Windows (Trade Mark). The drag information that is acquired at dragging start contains URL of the real data corresponding to the dragged HTML object. CPU of the terminal driven by the add-in program process, based on the drag information, creates a drag object by passing the data to the instance of the class (an object) that implants the COM IData Object interface.

The CPU of the terminal 10 driven by the add-in program process registers the drag object of the operating system to the operating system. (S45) The registration is implanted as calling to DoDragDrop API of Windows (Trade Mark). The CPU of the terminal 10 driven by the add-in program process saves the flag for deleting the drag information in RAM. (S50)

The CPU of the terminal 10, driven by the web application process deletes both the drag information and the icon 50 as the HTML object, if the flag to request deleting the drag information is saved at RAM. (S55)

The CPU of the terminal 10 driven by the operating system process performs ordinary drag operation. The CPU of the terminal 10 driven by the operating system process recognizes the drop operation. (S60) The CPU of the terminal 10 performs the following actions caused by the recognition.

The CPU of the terminal 10 driven by the operating system process inquires to the drop receive application process corresponding to the dropped location whether it accepts the drop or not. (S65) The drop receive application process means it is an application that receives drop of a drag object and Windows' (Trade Mark) Explore and others are applicable.

The CPU of the terminal 10 driven by the drop receive application process performs the following action if the drop receive application process accepts the drop to the above inquiry.

The CPU of the terminal 10 driven by the drop receive application process requests the real data to the add-in program process via the drag object registered in the operating system. (S70)

The CPU of the terminal 10 driven by the add-in program process receives the request for the real data via the drag object registered in the operating system. The CPU of the terminal 10 driven by the add-in program process, by acquiring the file request source cgi path from the HTLM file containing the web application script, sends request of the real data corresponding to the drag object with the path identifier as parameter held in the drag object to the information provider system 20. (S75) The approach to acquire the file request source cgi path from the HTLM file containing the web application script and send request of the real data corresponding to the drag object with the path identifier or the upload path identifier as parameter to the information provider system 20 is applicable for the following embodiment except special description.

The CPU of the information provider system 20 driven by the information provider program process receives the request of the real data corresponding to the drag object from the terminal. The CPU of the information provider system 20 driven by the information provider program process sends the real data corresponding to the drag object to the terminal.

The CPU of the terminal 10 driven by the add-in program process receives the real data corresponding to the drag object from the information provider system 20. (S80)

The CPU of the terminal 10 driven by the add-in program process delivers the received real data to the drop receive application process via the operating system. (S82)

The CPU of the terminal 10 driven by the drop receive application process acquires the real data from the add-in program process via the operating system. The CPU of the terminal 10 driven by the drop receive application process saves the acquired real data to HDD of the terminal via the operating systems. (S85) In first embodiment, the acquired real data is saved in HDD of the terminal 10; it can be also saved in RAM or others.

The CPU of the terminal 10 driven by the operating system process discards the drag object.

The action of dropping the drag object in the first embodiment is described in detail as follows. As dropping begins, the CPU of the terminal 10 driven by the add-in program process delivers the drag object to Windows (Trade Mark). The CPU of the terminal 10 driven by Windows (Trade Mark) process delivers the drag object to the drop destination application. The CPU of the terminal 10 driven by the drop destination application process requests the data to the drop source application process via Windows (Trade Mark). The add-in program as the drop source application holds the object that implements the IStream interface of COM. The object performs HTTP communication and delivers the acquired data to the drop destination application in stream format. The CPU of the terminal 10 driven by the add-in program process can deliver the acquired data to the drop destination application in streaming via the instance of the class (an object) that implements the ISream interface by issuing HTTP GET or POST request based on the path identifier held in the drag object.

To drag and drop the HTML object displayed on the web browser onto the folder of the operating system enables to download the file saved in HDD of the information provider system 20 to the terminal 10.

To extend function of the web application makes it less load to directly use the method of the operating system. Moreover, without intensive craft by the web application creator, to extend function of the web application enable it feasible to directly use the methods of the operating system. To make continuation between the performance of the HTML script's method and the performance of the operating system's method provides an intuitive and easy understandable user interface. The CPU of the terminal 10 can send request of deleting the file to the information provider system 20 in any place of the S80's following steps. In reality the terminal 10 and the information provider system 20 perform the following steps. The CPU of the terminal 10 driven by the add-in program process sends request of deleting the downloaded file to the information provider system 20. The CPU of the information provider system 20 driven by the information provider program process receives request of deleting the downloaded file from the terminal 10.

The CPU of the information provider system 20 driven by the information provider program process deletes the file on the delete request. The CPU of the information provider system 20 driven by the information provider program process sends the notification of completing file delete to the terminal 10. The notification of delete completion includes the path, the file name, the file attribute and others of the deleted file on the information provider system 20. The CPU of the terminal 10 driven by the add-in program process receives the notification of delete completion from the information provider system 20. The CPU of the terminal 10 driven by the add-in program process delivers the received notification of delete completion to the web application process. The CPU of the terminal 10 driven by the web application process receives the notification of delete completion from the add-in program process. The CPU of the terminal 10 driven by the web application process updates the display on web application as the file list saved in HDD of the information provider system 20 based on the received notification of delete completion. In reality, that means the icon or others corresponding to the deleted file, based on file name and the file attribute contained in the notification of delete completion, removed from the all display regions which display the file list of the path in the information provider system 20 containing the deleted file. This enables the file moving between the web application and the local application similar to the file moving between the local applications, like Explorer (Trade Mark) on the operating system of the terminal 10.

Figure 7:
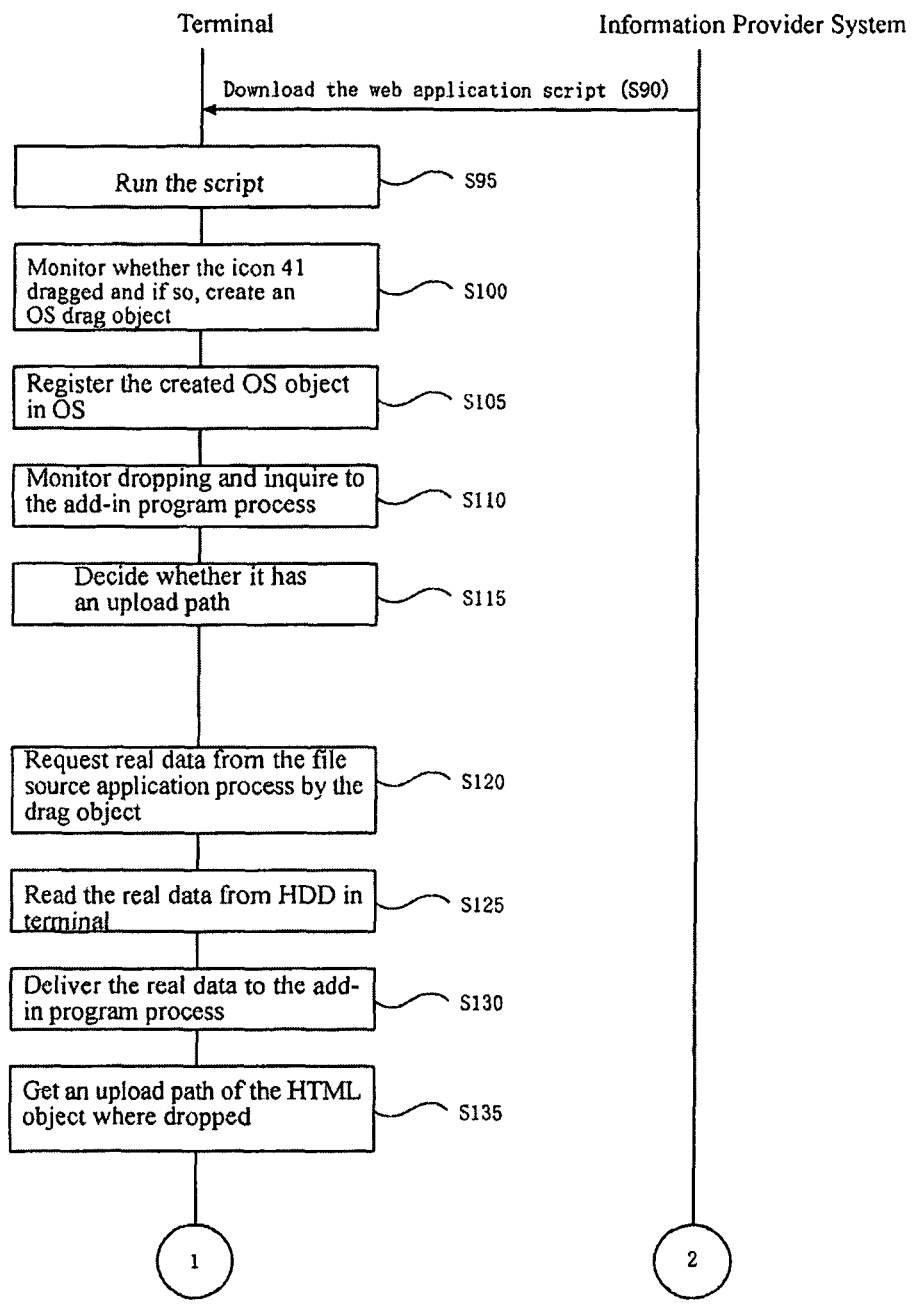
FIG. 7 is a flowchart of the terminal and the information provider system when the object of operating system is dragged and dropped onto HTML object displayed on the web browser.
Figure 8:
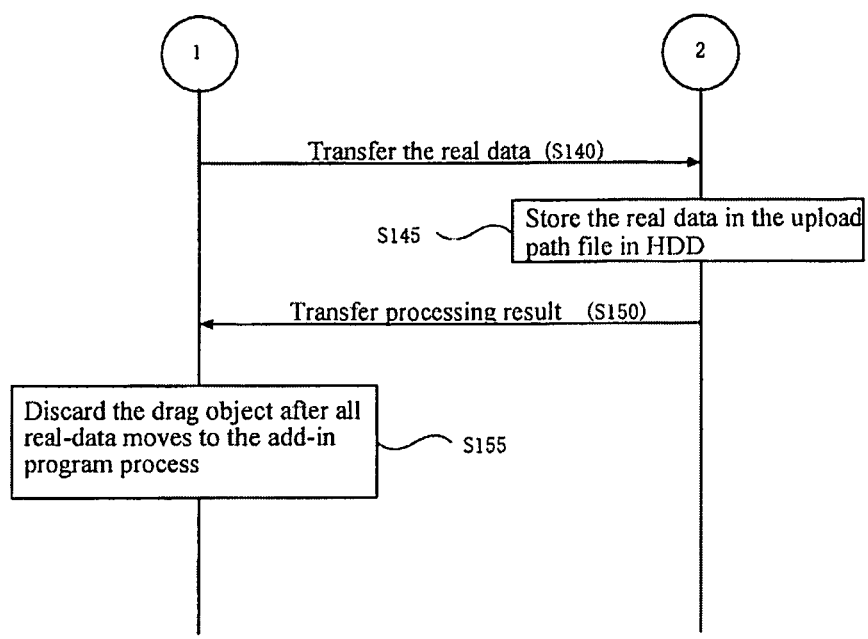
FIG. 8 is a continuation of FIG. 7.

Referring to a second embodiment, FIG. 7 and FIG. 8 are the flowcharts of the terminal 10 and the information systems 20 when the object of the operating system is dragged and dropped into the HTML object displayed on the web browser.

Figure 9:
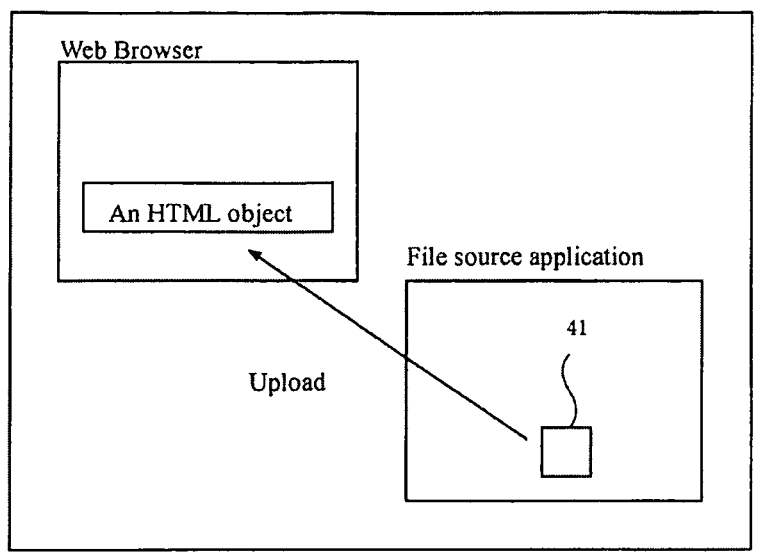
FIG. 9 is a structure diagram of an example display device when the web browser and the folder of the operating system are displayed on it.

The CPU of the terminal 10 driven by the web browser process downloads the web application script from the information system provider 20. (S90) The CPU of the terminal 10 driven by the web browser process runs the acquired web application script. (S95) FIG. 9 is the structure diagram of the display on which the web browser and the file source application are displayed. The file source application displays the icon corresponding to the file saved in HDD of the terminal 10 and provides the drag and drop function. Windows' (Trade Mark) Explore is applicable as the file source application. On the display area of the web browser an HTML object is displayed by web application function. On the display area of the file source application, the icon 41 corresponding to the designated file saved in HDD of the terminal 10 is displayed.

The CPU of the terminal 10 driven by the file source application process monitors whether the icon 41 is dragged and if so, creates the drag object of the operating systems. (S100) The CPU of the terminal 10 driven by the file source application registers the drag object of the operating system to the operating system. (S105)

The CPU of the terminal 10 driven by the operating system process performs the ordinary drag action.

To show the possible drop destination object to user, the CPU of the terminal driven by the add-in program process can monitor whether the mouse pointer places on the HTML object holding the upload path, if so, read the event of the HTML script from the web application and issues the event.

The CPU of the terminal 10 driven by the operating system process monitors the drop and if the drop destination is on the display region of the web browser, it inquires to the add-in program process whether the drop of the drag object is accepted or not. (S110)

As response to the above inquire, the CPU of the terminal 10 driven by the add-in program process decides whether the drop destination HTML object holds the upload path identifier or not. (S115) The fact that the drop destination HTML object holds the upload path identifier means that the HTML object associated with the upload identifier is saved in RAM. In the second embodiment, as the upload path identifier, the upload path is associated with the HTML object. In S115, the CPU of the terminal 10 driven by the add-in program process decides whether the drop destination HTML object holds the designated attribute for storing the upload path, if so, it can call the designated function to read the upload path already saved in RAM and others. The CPU of the terminal 10 driven by the add-in program process can pass the object identifier of the drop destination HTML object as parameter to call the above function and read the upload path associated with the object identifier from the storage unit such as RAM and others. If the CPU of the terminal 10 driven by the add-in program process holds the upload path of the drop destination HTML object, it performs the following steps.

The CPU of the terminal 10 driven by the add-in program process sends request of the real data to the file source application process via the drag object registered in the operating system. (S120)

The CPU of the terminal 10 driven by the file source application process receives request of the real data via the drag object registered in the operating system. The CPU of the terminal 10 driven by the file source application process reads the real data corresponding to the drag object from HDD of the terminal 10. (S125) The CPU of the terminal 10 driven by the file source application process delivers the read real data to the add-in program process via the operating system. (S130)

The CPU of the terminal 10 driven by the add-in program process acquires the real data from the file source application via the operating system. The CPU of the terminal 10 driven by the add-in program process acquires the upload path that a HTML object located on the dropped spot holds. (S135) The CPU of the terminal 10 driven by the add-in program process sends the real data to the information provider system 20 based on the acquired upload path. (S140)

The CPU of the information provider system 20 driven by the information provider program process receives the real data and saves it in the HDD storage region of the information provider system 20 corresponding to the upload path. (S145) The CPU of the information provider system 20 driven by the information provider program process sends the process result to the terminal. (S150) The CPU of the terminal 10 driven by the add-in program process receives the uploading process result from the information provider system 20. The uploading process result includes the upload path of the upload destination of the information provider system 20, the file name, the file attribute, and the information of coordination to display the icon on the web application and other information. The CPU of the terminal 10 driven by the add-in program process delivers the received uploading process result to the web application process. The CPU of the terminal 10 driven by the web application process receives the uploading process result from the add-in program process. The CPU of the terminal 10 driven by the web application process updates the display on the web application as the list of the files saved on HDD of the information provider system 20 based on the received uploading process result. In reality, for all the display regions which display the list of the file in the upload path, based on the file name, attribute information and icon coordination information, which are included in the process result, the icon associated with each file attribute in the web application is appended to them as a file icon. The file information saved in HDD of the information provider system 20 may be displayed hierarchically for each folder that holds the file corresponding to the file identifier.

The CPU of the terminal 10 driven by the operating system process discards the drag object caused by the event that all the real data is delivered to the add-in program. (S155)

To drag and drop the object of the operating system onto the HTML object enables to upload the file saved in HDD of the terminal 10 to the information provider system 20.

To extend function of the web application makes it less load to directly use the method of the operating system. Moreover, without intensive craft by the web application creator, to extend function of the web application enable it feasible to directly use the methods of the operating system. To make continuation between the performance of the HTML script's method and the performance of the operating system's method provides an intuitive and easy understandable user interface. The CPU of the terminal 10 driven by the add-in program process can acquire the file path from the real data contained in the drag object before discarding the drag object of S155 and after receiving the uploading process result from the information provider system 20 then it can delete the file corresponding to the file path.

This enables file moving between the web application and the local application as same as between the local applications, like Explorer (Trade Mark) on the operating system of the terminal 10.

In a third embodiment, it is an approach to pastes the real data corresponding to the HTML object displayed on the web browser A onto the designated element displayed on the web browser B by dragging and dropping the HML object displayed on the web browser A onto the other web browser (call as the web browser B). Action of the terminal 10 and the information provider system 20 is described in detail under the followings.

The CPU of the terminal 10 driven by the web browser A's process downloads the web application script from the information provider system 20. The CPU of the terminal 10 driven by the web browser A's process runs the downloaded web application script.

The CPU of the terminal 10 driven by the web browser B's process downloads the web page of a bulletin board or others corresponding to the URL instructed by the keyboard from the external information provider system specified by URL.

The CPU of the terminal 10 driven by the web browser B's process displays the downloaded web page of a bulletin board or others from the external information provider system on the web browser B's display region.

Figure 10:
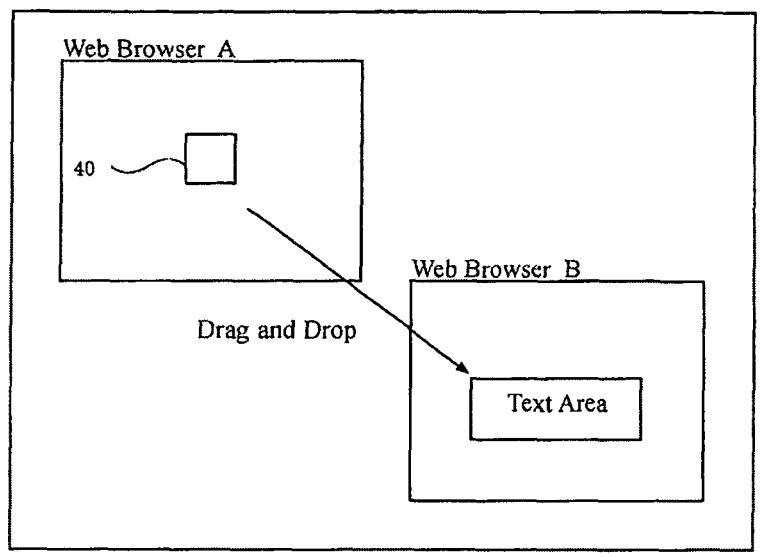
FIG. 10 is a structure diagram of an example display device when the web browser A and the web browser B are displayed on it

FIG. 10 is the structure diagram of the display on which the CPU of the terminal 10 displays the web browser A and the web browser B. On the display area of the web browser A, the icon 40 corresponding to a designated file saved in HDD of the information provider system 20 is displayed as an HTML object by web application function. The HTML object can run the designated script driven by the mousedown event, mousemove event and mouseup event. This can enable the HTML object to move by using the mouse.

On the display area of the web browser B, the web page of the bulletin board which provides a text area for inputting a comment. The CPU of the terminal 10 runs the add-in program A to extend the function of the web browser A and the add-in program B to extend the function of the web browser B.

The CPU of the terminal 10 driven by the web application process monitors whether the icon 40 is dragged and if so, creates the drag information and the icon 50 which moves along the mouse pointer during dragging. The CPU of the terminal 10 driven by the web application process associates the drag information with the icon 40 and saves it in RAM. The drag information contains the path identifier of the information provider system 20 as the same as the first embodiment.

The CPU of the terminal 10 driven by the add-in program A process monitors whether the association of the icon 40 and the drag information is saved in RAM and the mouse pointer moves out the browser A display region. The CPU of the terminal 10 driven by add-in program A process reads the drag information associated with the icon 40 from RAM. The CPU of the terminal 10 driven by the add-in program A process creates a drag object of the operating system based on the read drag information. The detailed action of creating the drag object is the same as the first embodiment, therefore it is omitted.

The CPU of the terminal 10 driven by the add-in program A process registers the drag object of the operating system to the operating system. The registration implemented by calling the DoDragDrop API of Windows (Trade Mark). The CPU of the terminal 10 driven by the add-in program process saves the flag information of deleting request of the drag information in RAM.

The CPU of the terminal 10, driven by the web application process deletes both the drag information and the icon 50 as the HTML object, if the flag to deleting the drag information is set in RAM.

The CPU of the terminal 10 driven by the operating system process performs ordinary drag operation. The CPU of the terminal 10 driven by the operating system process recognizes the drop object is dropped in the display region of the web browser B.

The CPU of the terminal 10 performs the following actions caused by the recognition.

The CPU of the terminal 10 driven by the operating system process inquires whether to accept the drop of the drag object or not to the add-in program B's process that extends function of the web browser B at the dropping position.

The CPU of the terminal 10 driven by the add-in program B's process decides whether the drop destination HTML object is just the HTML object represented by the same designated HTML tag saved in the storage unit like RAM or not. The designated HTML tag might be textarea tag, div tag and others. The CPU of the terminal 10 driven by the add-in program B's process pre-reads the designated file located on the terminal 10 at the add-in program B starting, and it is done at the add-in program B starting to save the designated HTML tag into the storage unit like RAM. The CPU of the terminal 10 driven by the add-in program B's process performs the following steps if the drop destination HTML object is just the HTML object represented by the same designated HTML tag saved in the storage unit like above mentioned RAM.

The CPU of the terminal 10 driven by the add-in program B's process requests for the real data via the drag object of the operating system to the add-in program A's process.

The CPU of the terminal 10 driven by the add-in program A's process receives the request for the real data via the drag object of the operating system. The CPU of the terminal 10 driven by the add-in program A's process sends the request for the real data corresponding to the drag object to the information provider system 20.

The CPU of the information provider system 20 driven by the information provider program process receives the request of the real data corresponding to the drag object from the terminal 10. The CPU of the information provider system 20 driven by the information provider program process sends the real data corresponding to the drag object to the terminal 10 by reading the real data corresponding to the drag object from the HDD.

The CPU of the terminal 10 driven by the add-in program A's process receives the real data corresponding to the drag object from the information provider system 20. The CPU of the terminal 10 driven by the add-in program A's process delivers the received real data to the add-in program B's process via the operating system.

Figure 11:
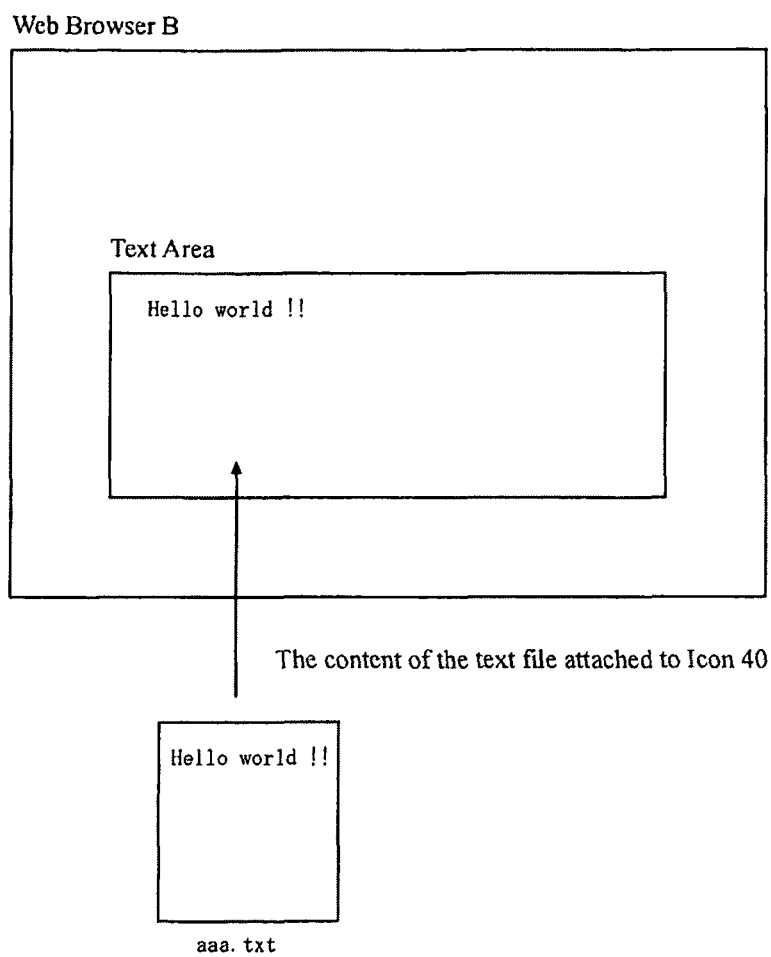
FIG. 11 is a structure diagram of the display device after the icon 40 (text file aaa.txt) is dropped onto the text area of the bulletin board displayed on the web browser B.

The CPU of the terminal 10 driven by the add-in program B's process acquires the real data from the add-in program A's process via the operating system. The CPU of the terminal 10 driven by the add-in program B's process changes the value of the HTML object at the dropped spot into the acquired real data. If the HTML object is a text area, the value of the text area is changed to the acquired real data. FIG. 11 is the structure diagram after the icon 40 (corresponding to the text file (aas.txt)) displayed on the display area of the web browser A is dropped on the bulletin's text area displayed on the web browser B.

The CPU of the terminal 10 driven by the operating system process discards the drag object.

This enables to pastes the file context saved in HDD of the information provider system 20 onto the designated element displayed on the web browser B by dragging and dropping the HML object displayed on the web browser A onto the designated HTML object displayed on web browser B.

A fourth embodiment provides function of dragging and dropping the object of the operating system which makes it easily feasible to upload the file corresponding to the object of the operating system to the information system provider 20. Action of the terminal 10 and the information provider system 20 is explained as follows.

Figure 12:
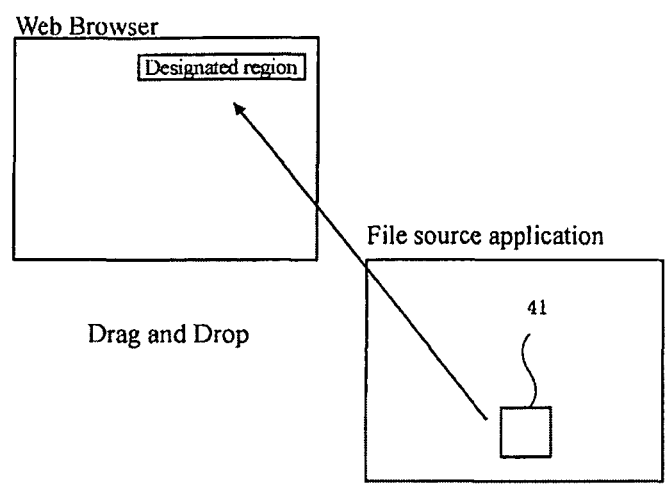
FIG. 12 is a structure diagram of the display device when the web browser and the file destination application are displayed.

FIG. 12 is the structure diagram of the CPU of the terminal 10 display the web browser as the designated program and the file source application on the display. The file source application displays the icon corresponding to the file saved in HDD of the terminal 10 and provides the drag and drop function. On the display area of the file source application, the icon 41 corresponding to the designated file saved in HDD of the terminal 10 is displayed.

The CPU of the terminal 10 driven by the file source application process monitors whether the icon 41 is dragged and if so, creates the drag object of the operating system. The CPU of the terminal 10 driven by the file source application registers the drag object of the operating system to the operating system.

The CPU of the terminal 10 driven by the operating system process performs the ordinary drag operation. The CPU of the terminal 10 driven by the operating system process monitors the drop and if the drop destination is on the display region of the web browser, it inquires to the add-in program process whether the drop of the drag object is accepted or not. The designated area may be applicable for the window of the web browser or designated icon, it can be arbitrarily defined if it is within the range where the mouse pointer is movable The CPU of the terminal 10 driven by the add-in program process requests for the real data to the file source application process via the drag object of the operating system.

The CPU of the terminal 10 driven by the file source application process receives the request of the real data via the drag object of the operating system. The CPU of the terminal 10 driven by the file source application process reads the real data corresponding to the drag object from HDD of the terminal 10. The CPU of the terminal 10 driven by the file source application process delivers the read real data to the add-in program process via the operating system.

The CPU of the terminal 10 driven by the add-in program process acquires the real data from the file source application process via the operating system. The CPU of the terminal 10 driven by the add-in program process pre-reads the upload path from the designated file of the terminal 10 and saves the upload path in the storage unit, like RAM, at the add-in program starting. The CPU of the terminal 10 driven by the add-in program process sends the real data to the information provider system 20 based on the upload path acquired at starting.

The CPU of the information provider system 20 driven by the information provider program process receives the real data and saves it in the storage unit of HDD of the information provider system 20 corresponding to the upload path. The CPU of the information provider system 20 driven by the information provider program process sends the process result to the terminal.

The CPU of the terminal 10 driven by the operating system process discards the drag object caused by the event that all the real data is delivered to the add-in program.

To drag and drop the object of the operating system onto designated region enables to easily upload the file corresponding to the object of the operating system to the information provider system 20.

In an embodiment, the CPU of the terminal 10 runs the invented add-in program caused by the event that the web browser performs or the input device receives instruction from the user. The add-in program is not necessary to be the add-in program that extends function of the browser. The invented add-in program can run as the toolbars appended to Windows' (Trade Mark) Explorer or the toolbars appended to the task bar displayed on the desktop.

To drag and drop the icon of the file or others corresponding to the object of the operating system onto 'the designated region' of the toolbars appended to Explorer or Desktop's task bar enables to easily upload the file saved in HDD of the terminal 10 to the information provider system 20. Moreover in an embodiment, 'the designated region' can be charged on more condition of 'on the upload permitted HTML Object'. It can be decided as the upload permitted HTML object if the association between the HTML object and the flag for the upload permission is saved in the storage unit like RAM.

The invented add-in program can be provided to the users as a standalone application rather than an add-in program.

More example embodiments of the invention are feasible. The information that updates the display of the web application is to be obtained by the add-in program, but is also applicable to be obtained by the difference information by the web application communicating with the information provider system 20. The notifications of upload are considered for uploading the file to the information provider system 20 or for deleting the file on the information provider system 20, then updating the display of the web application can only display the messages: 'Uploading the file to the information provider system 20 is completed' or 'Moving the file from the information provider system 20 is completed'. The targets of downloading and uploading can be files or folders, and the number of the files or folders of downloading and uploading can be plural. The partial text on the display region of the web application can be selected and dragged to be dropped into the drop receive application, then the add-in program can create a new text file which context is selected one and save it to the storage unit of the terminal. Similarly the partial text displayed on the text editor can be selected and dragged to be dropped into the drop receive application, then the add-in program can create a new text file which context is selected one and save it to the storage unit of the information provider system 20. While the partial text is selected and dropped, the context of the text can be edited if necessary.

As the condition on uploading, adding to the condition that the dropped HTML object holds the upload path, condition that the object holds the specific method or the object is in the specific sate can be applicable. For the condition on downloading, adding to the condition that the HTML object holds the specific method can be applicable. As the specific methods, mousedown, mousemove, mouseup, and other events, and the invoked function associated with them are applicable. The path identifier in the first embodiment, the upload path identifier in the second embodiment can be URLs. URL for cgi request can be obtained by the add-in program by inquiring to the information provider system 20 or by reading from the destination file at its starting. This approach is also applicable in the third embodiment and the fourth embodiment. In the third embodiment, the update target by the pasted HTML object can be the attribute rather than the value of the HTML object. In the fourth embodiment, for expanding the information saved in HDD of the information provider system 20 onto the spreadsheet web application, the tag composite written by the designated rule as continuation is saved as the HTML tags in RAM at the add-in program B, and the rule can be applicable to paste them on the designated display of the web browser B. The paste rule can be obtained by reading the destination file of the terminal 10 at the add-in program's starting, and also be obtained by the web browser script or provided from the information provider system 20.

In all embodiments, it is assumed that the terminal 10 and information provider system are separated computer systems; the add-in program and the information provider program can be run on the terminal 10. The terminal 10 works as the information provider system 20.

The invention claimed is:

1. A computer-implemented add-in method that extends function of an HTTP client of a terminal, wherein the terminal comprises a storage unit, an input device, and a processing unit, and wherein the method adds a download function to the HTTP client, the method comprising:
    reading drag information which is associated with an HTML object from the storage unit of the terminal when the HTML object displayed on a display area of the HTTP client and the drag information of the HTML object are associated, the association is saved in the storage unit of the terminal, and the HTML object is moved out of the display area of the HTTP client by the input device, the drag information including a file identifier of real data corresponding to the HTML object;
    creating a drag object of the operating system based on read drag information;
    registering the created drag object to an operating system;
    receiving the real data corresponding to the drag object using the file identifier to store in the storage unit of the terminal from an outside information provider system;
    determining a context of the real data; and
    rewriting an attribute of the drag object at the dropped position based on the context of the real data such that a value of the drag object is changed to the real data.

2. The method of claim 1, wherein the terminal saves designated HTML tag identifiers enabling the HTTP client to rewrite the attribute of the drag object by:
    acquiring the real data corresponding to the drag object, if the HTML object at the drag object of the operating system dropping has the same tag identification as that saved in the storage unit.

3. The method of claim 1, further comprising:
    sending a request for deleting data corresponding to the real data from the storage unit of the information provider system to the information provider system.

4. The method of claim 3, further comprising:
    receiving notification of deletion of the data corresponding to the real data from the information provider system; and
    deleting the HTML object corresponding to the real data from the display region of the HTTP client based on the received notification.

5. The method of claim 1, wherein the file identifier includes a path identifier and a file name of the real data.

6. The method of claim 1, wherein the file identifier is a uniform resource locator.

7. A computer implemented download method used by a computer system, wherein a terminal running an HTTP client and an information provider system are connected with a network communication unit, the method comprising:
    reading, by the terminal, drag information which is associated with an HTML object from a storage unit of the terminal when the HTML object displayed on a display area of the HTTP client and the drag information of the HTML object are associated, wherein the association is saved in the storage unit of the terminal and the HTML object is moved out of the display area of the HTTP client by an input device, the drag information including a file identifier of real data corresponding to the HTML object;
    creating, by the terminal, a drag object of an operating system based on the drag information;
    registering, by the terminal, the drag object to the operating system;
    sending, by the terminal, a request of downloading the real data corresponding to the drag object when dropping of the drag object is acknowledged using the file identifier;
    receiving, by the information provider system, the request of downloading the real data corresponding to the drag object from the terminal;
    sending, by the information provider system, the real data corresponding to the drag object to the terminal based on the received request;
    receiving, by the terminal, the real data corresponding to the drag object from the information provider system;
    saving, by the terminal, the received real data to the storage unit of the terminal;
    determining a context of the real data and
    rewriting an attribute of the drag object at the dropped position based on the context of the real data such that a value of the drag object is changed to the real data.

8. The method of claim 7, further comprising:
sending, by the terminal, a request of deleting the data corresponding to the real data from the storage unit of the information provider system to the information provider system;
receiving, by the information provider system, the request of deleting the data corresponding to the real data from the storage unit of the information provider system from the terminal; and
deleting, by the information provider system, the data corresponding to the real data from the storage unit of the information provider system.

9. The method of claim 8, further comprising:
sending, by the information provider system, notification of deleting the data corresponding to the real data from the storage unit of the information provider system to the terminal;
receiving, by the terminal, the notification of deleting the data corresponding to the real data from the storage unit of the information provider system from the information provider system; and
deleting, by the terminal, the HTML object corresponding to the real data from the display region of the HTTP client based on the received notification.

* * * * *